United States Patent [19]

Kubin et al.

[11] Patent Number: 4,940,010
[45] Date of Patent: Jul. 10, 1990

[54] ACID GAS CONTROL PROCESS AND APPARATUS FOR WASTE FIRED INCINERATORS

[75] Inventors: Peter Z. Kubin; Jiri E. Stepan, both of Livingston, N.J.

[73] Assignee: Ogden-Martin Systems, Inc., Fairfield, N.J.

[21] Appl. No.: 222,909

[22] Filed: Jul. 22, 1988

[51] Int. Cl.$^5$ .............................................. F23B 7/00
[52] U.S. Cl. ................................... 110/233; 110/235; 110/344; 110/345
[58] Field of Search .................. 110/344, 345, 101 C, 110/342, 347, 343, 233, 235

[56] References Cited

U.S. PATENT DOCUMENTS

| | | |
|---|---|---|
| 1,545,620 | 7/1927 | Trent . |
| 1,669,084 | 5/1928 | Grindle . |
| 1,857,643 | 5/1932 | Kinyon . |
| 2,409,002 | 10/1946 | Smith . |
| 2,718,453 | 9/1955 | Beckman . |
| 2,800,172 | 7/1957 | Romer et al. . |
| 3,089,539 | 5/1963 | Vermillion et al. . |
| 3,167,039 | 1/1965 | Wilsdon et al. . |
| 3,343,908 | 9/1967 | Wickert . |
| 3,481,289 | 12/1969 | Oda et al. . |
| 3,488,129 | 1/1970 | Itoh . |
| 3,520,649 | 7/1970 | Tomany et al. . |
| 3,556,024 | 1/1971 | Fuller et al. . |
| 3,574,530 | 4/1971 | Suriani et al. . |
| 3,633,780 | 1/1972 | Rausing . |
| 3,642,445 | 2/1972 | Muter et al. . |
| 3,689,045 | 9/1972 | Coulter et al. . |
| 3,699,209 | 10/1972 | Ward . |
| 3,854,778 | 12/1974 | Trythall . |
| 3,969,482 | 7/1976 | Teller . |
| 3,995,005 | 11/1976 | Teller . |
| 4,022,869 | 5/1977 | Saitoh et al. . |
| 4,082,364 | 4/1978 | Krambrock . |
| 4,102,777 | 7/1978 | Wall . |
| 4,111,755 | 9/1978 | Ban et al. . |
| 4,118,075 | 10/1978 | Lubbehusen . |
| 4,185,080 | 1/1980 | Rechmeier . |
| 4,235,585 | 11/1980 | Anderson . |
| 4,253,408 | 3/1981 | Kramer . |
| 4,322,218 | 3/1982 | Nozaki . |
| 4,331,638 | 5/1982 | Michelfelder . |
| 4,341,745 | 7/1982 | Zopff et al. . |
| 4,385,567 | 5/1983 | Voss .................... 110/342 X |
| 4,440,100 | 4/1984 | Michelfelder et al. . |
| 4,474,122 | 10/1984 | Hokari et al. . |
| 4,503,785 | 3/1985 | Scocca . |
| 4,519,995 | 5/1985 | Schrofelbauer et al. . |
| 4,525,142 | 6/1985 | Gleason et al. . |

(List continued on next page.)

FOREIGN PATENT DOCUMENTS 878723  11/1958  United Kingdom .

OTHER PUBLICATIONS

Zentgraf, "The Present Sate of Flue Gas Desulphurization", Combustion, Nov. 1969, pp. 6–8.
Cantieri et al., "Control of Corrosion and Deposits in Oil-Fired Boilers", Combustion, Jan. 1961, p. 48.
In Re Wilsdon, 332 F. 2d 182 (C.C.P.A. 1964).

Primary Examiner—Edward G. Favors
Attorney, Agent, or Firm—Dickstein, Shapiro & Morin

[57] ABSTRACT

An apparatus for incinerating waste material and for reducing noxious byproducts of the incineration process. The apparatus consists of a furnace having a turbulent reaction zone whereby an overfire air header and additive distributor and lime injection nozzles connected to the incinerator through a plurality of nozzles located at even distances about the arrangement is the turbulent reaction zone of the furnace such that an additive mixture is injected into the turbulent zone through and distributed evenly during combustion across the entire width of the turbulent area. As a result, a reaction between the combustion products and the additive is optimized resulting in an overall reduction in acid gas content, acid dewpoint temperature and the corrosion levels inside the incinerator and auxiliary equipment.

10 Claims, 3 Drawing Sheets

U.S. PATENT DOCUMENTS

| | | |
|---|---|---|
| 4,539,190 | 9/1985 | Shinoda et al. . |
| 4,552,732 | 11/1985 | Hillekamp . |
| 4,555,996 | 12/1985 | Torbov et al. ............... 110/345 |
| 4,559,211 | 12/1985 | Feldman et al. . |
| 4,582,454 | 4/1986 | Brandenburg et al. . |
| 4,588,568 | 5/1986 | Pollmann et al. . |
| 4,590,049 | 5/1986 | Staudinger . |
| 4,603,037 | 7/1986 | Yoon . |
| 4,604,269 | 8/1986 | Yoon . |
| 4,609,538 | 9/1986 | Sugiura et al. . |
| 4,613,487 | 9/1986 | Yoon et al. . |
| 4,616,574 | 10/1986 | Abrams et al. . |
| 4,624,192 | 11/1986 | Mansfield ........................ 110/344 |
| 4,626,418 | 12/1986 | College et al. . |
| 4,639,209 | 1/1987 | Grethe . |
| 4,644,879 | 2/1987 | Grethe et al. . |
| 4,645,654 | 2/1987 | Barczak . |
| 4,655,148 | 4/1987 | Winship ...................... 110/345 X |
| 4,663,136 | 5/1987 | Furlong . |
| 4,702,899 | 10/1987 | Barczak et al. . |
| 4,774,893 | 10/1988 | Dumbaugh ................. 110/101 C X |
| 4,793,268 | 12/1988 | Kukin et al. ..................... 110/347 |

ACID GAS CONTROL PROCESS AND APPARATUS FOR WASTE FIRED INCINERATORS

BACKGROUND OF THE INVENTION

The present invention relates to a method and an apparatus for reducing the acid gas and pollutants content in the combustion products, the acid dewpoint temperature and the level of corrosion of the waste-fired incinerators using either mass burning or refuse-derived fuel burning and their auxiliary equipment.

A general problem exists for municipal or industrial waste burning incinerators in how to efficiently and cost effectively control pollutants, acid gases, and damage to incinerators and their auxiliary equipment as a result of burning waste materials. More particularly, it has been found that the combustion of wastes results in the formation of hydrochloric acid, sulfur dioxide, sulfur trioxide and a number of other combustion by-products, which could cause amongst a host of other problems atmospheric pollution and subject the incinerator and their auxiliary equipment to the possible shortening of their service life.

A number of attempts have been made to date with other types of incinerators, i.e., fluidized bed combustors, by adding various sorbent materials to the waste or at different stages of the incineration process in order to reduce noxious gases and the level of corrosion.

For example, the Hokari et al. patent (U.S. Pat. No. 4,474,122) discloses adding earth metal carbonates into the fluidized bed portion of a fluidized incinerator. The additives are provided either by means of a screw feeder or together with air such that the powdery carbonates undergo a reaction with the acidic gases contained in the fluidized bed.

A different method for protecting incinerator surfaces is exemplified by the Kramer patent (U.S. Pat. No. 4,253,403). In particular, Kramer discloses mixing the incineration waste materials with additives such as limestone prior to combusting the materials in the incinerator. During operation of the incinerator, the waste materials and additive mixtures are then injected into the combustion zone such that the combined products provide a raised fusion temperature in order to promote increased reaction between the waste material and the additive.

Other arrangements include the Fuller et al. patent (U.S. Pat. No. 3,556,024) and the Rausing patent (U.S. Pat. No. 3,633,780). Each of these disclose methods for reducing corrosion or emissions through adding an alkali metal to the waste material prior to burning. These latter methods, however, can create several inefficiencies or can require an investment in equipment for pre-mixing the additive with waste materials.

Second, in order to fulfill state and federal environmental standards, a relatively high percentage of the noxious gases produced during the refuse incineration process would have to be removed. Prior art teachings, however, have not devised a method whereby the reduction of pollutants is optimized from a cost standpoint in order to comply with state and federal environmental standards with respect to emissions and ambient air levels and the like. A need thereby exists for an efficient, lowcost noxious gas control system that fulfills current environmental standards.

SUMMARY OF THE INVENTION

It is therefore an object of the present invention to overcome the inefficiencies of the prior art methods and apparatus by employing a method for injecting additive materials directly into an incinerator during combustion, and employing an apparatus that allows the injection process to occur automatically without substantial intervention by human operators.

More particularly, the present invention is directed to a process for injecting a material directly into the turbulent reaction zone of an incinerator furnace, such that optimum adsorption reactions with combustion products of the waste materials are achieved.

In addition, the present invention can be combined with a semi-dry scrubbing system located downstream of the convection and heat recovery equipment in order to achieve a reduction in the noxious gas content while economizing on the expense of such equipment on a cost per ton of pollutant. The semi-dry scrubbing system can employ a scrubber/reactor and a particulate control device such as a baghouse filter or an electrostatic precipitator.

It is an additional object of the present invention to employ an automated additive metering and feeding means and an additive injection means whereby the additives are delivered to the furnace chamber in a manner in which the additive is dispersed evenly across the entire turbulent reaction zone of the incinerator combustion chamber.

It is yet an additional object of the present invention to provide an additive injection means consisting of a plurality of air and additive nozzles, each of which are connected to an incinerator overfire header and additive distributor supplied with additive from a plurality of storage bins. The material flow from the additive metering and feeding system is metered and automatically controlled so as to ensure adequate quantities of additive for substantial reduction of the acid content and dewpoint levels of the combustion gases over a significant period of operation, or to reduce the acid gas content to a predetermined or controlled level (value).

The method of this invention is further achieved by means of one or several incinerators consisting of a furnace section having a turbulent reaction (flame) zone. The incinerator, for example, may also include first, second, third and fourth gas passages. Other gas passage configurations, however, may be employed with the apparatus and process described herein. Moreover, the incinerator may include, for example, a reciprocating stoker for agitating waste material which will enable the combustion process to complete. The details of the incinerator set forth in the specification merely represent one environment in which the additive injection system of the present invention can be employed. Other appilcations for the present invention can include fluidized bed, dutch oven, modular type, starved type and other moving stoker type incinerator configurations.

The additive metering/feeder system is connected to the additive distributor and the overfire header which, in turn, is connected with the furnace section. The overfire header and additive distributor are attached to a plurality of supply pipes such that the pipes inject an air stream containing an additive material directly into the turbulent reaction zone of the furnace.

The additive metering/feeder system for supplying materials to the headers consists of a bulk storage silo for holding the additives. The bulk storage silo is loaded through a truck unload line attached at the top portion to the silo. The silo further includes a venting and dust baghouse filter for minimizing the amount of fugitive airborne materials outside the bulk storage silo.

A vibrating means is located along the conical hopper portion of the storage silo and is used to vibrate the conical hopper such that additives stored in the silo flow freely through the hopper when the silo is being emptied.

Additives are removed from the silo through a pipe and are metered and controlled by a motorized rotary feeder located below the vibrator. The feeder is used to control the rate in which the additives flow out of the bulk storage silo and into a transfer pneumatic conveying means. This transfer pneumatic conveying means, in turn, supplies the additive to a plurality of day (surge) bins. Each of the bins is set up in a manner similar to that of the bulk storage silo. In other words, each includes a venting means for fugitive dust emission control, a vibrating means for the additive hopper flow control, and a metering feeder means at the base of the hopper for controlling the flow rate of the additive into a pneumatic conveying system. Each day (surge) bin, however, further includes a motorized inlet or diverter valve for directing the flow of additive from the bulk storage silo into a particular day (surge) bin.

When a day (surge) bin indicates a low level, two-way isolation valves in the pneumatic conveying system will automatically position to allow feed to that bin. Next, the conveying air blower will start and, when sufficient air flow is established, the lime silo rotary valve will begin to feed the pulverized additive. When the feed bin is full the additive feed will stop and after the conveying line has been purged, the blower will stop.

Each day (surge) bin will have a storage capacity of approximately eight hours and will include vent baghouse and level indicators. The silo's conical hopper will be equipped with a vibrating discharger and a metering feeder mounted at the bin outlet. The metering feeder will have a variable speed drive which will accept a control signal and vary the hydrated lime feed rate to the boiler. As such, the apparatus provides a continuous, and automatically controlled flow of additives into the turbulent reaction zone of the furnace.

The contact between the additives and the combustion gases is optimized to the extent that sulfur dioxide, sulfur trioxide, hydrochloric acid and the acid dewpoint temperatures are significantly reduced. As a result, waste material pollution is minimized without, for example, the expense of (special) acid gas scrubbing equipment.

DETAILED DESCRIPTION OF THE DRAWINGS

Figure 1:
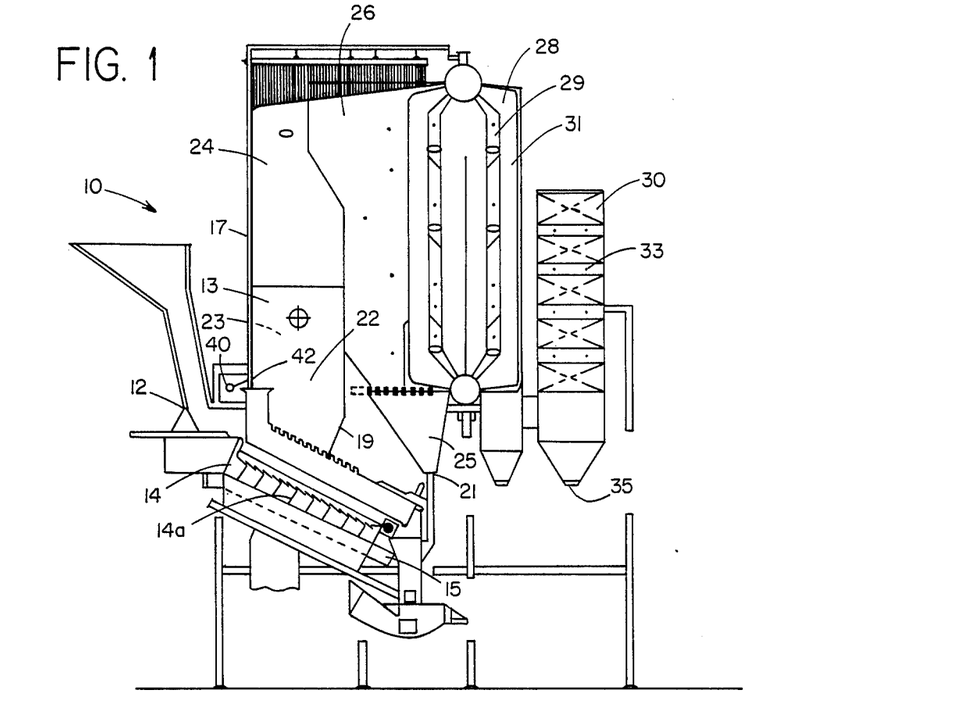
FIG. 1 is a cross-sectional view of the incinerator forming part of the present invention.

Referring now to the drawings wherein like parts are designated by like reference numerals throughout, there is illustrated in FIG. 1, an incineration system 10, which is used to dry, ignite and combust various waste materials.

More particularly, the present invention is described in the context of one or more incinerators 10 which represent one example of an incinerator system which can use the additive injection system and process. It is therefore contemplated that the present invention can form part of any incineration system.

The incineration exemplified in FIG. 1 consists of a stoker grate, a boiler furnace/combustion chamber, constructed of gas-tight and continuously welded waterwalls down to the grate surface. The incineration system, for example, can include one or more gas passages. FIG. 1 shows the relationship of the integrated furnace and boiler.

In the combustion chamber, all unburned gases will be led back under the rear arch directly into the high-temperature combustion zone. This will permit the maximum burnout of nonaqueous condensible matter and eliminate odors. The combustion chamber exit temperature will be sufficiently high to destroy odorous vapors. At the furnace throat 12, where the combustion takes place, the closely spaced high-pressure overfire air jets on the front wall 17 and rear furnace wall 19 will cause intense localized gas and flame turbulence to ensure complete combustion of the unburned gases before they pass into the boiler bank and subsequent heat transfer sections.

A stoker grate 14 is located below the combustion chamber 13 and the turbulent reaction zone 22 and is inclined downward from the feed area and toward the discharge end 15 of the furnace. The stoker grate 14 represents only one example, manufactured by Martin GmbH, of a stoker design that can be used in combination with the present invention. The stoker consists of a plurality of moving and stationary grate bars 14a which will push and agitate the burning refuse to form an even depth of material in the fuel bed. In this embodiment, burning waste will be pushed back underneath the freshly fed waste to achieve continuous drying, volatilization, ignition and combustion.

Combustion air is admitted to the refuse layer through specially designed air slots (not shown). The design of the grate/air system ensures consistent air distribution across the stoker 14 at all times.

The turbulent combustion zone 22, in turn, is enclosed by front wall 17, side walls 23 and rear wall 19. Either the front wall portion 17 or the rear wall portion 19 are provided with an additive injection system, consisting of an overfire (header) 40, an additive distributor (not shown), and a number of closely spaced injector nozzles 42 which are used to convey an air stream and the additive directly throughout the entire width of the turbulent zone. The injection of the additive can thus occur through any wall adjacent the turbulent reaction zone 22. The overfire header and additive distributor are supplied by an additive metering feeder system (FIG. 3) such that the additive materials are pressure-injected evenly and continuously across the entire turbulent reaction zone 22 of the furnace.

A series of plenum chambers underneath the stoker grate will admit primary combustion air at rates precisely controlled to suit the combustion conditions of each burning zone. The overfire header 40 and nozzle system 42 also is designed to ensure maximum penetration of the gas stream above the stoker. Such a design achieves flame shaping and thorough burnout of the combustion products, including organic compounds.

The combustion air will be taken from a refuse pit area (not shown) and directed into the underfire and overfire air fan inlets. To ensure maximum burnout of refuse with high moisture content, a steam-heated combustion air preheater (not shown) can be used. The preheater will be located at the underfire air fan outlet and will be capable of preheating incoming ambient air when firing any refuse having a low heating value.

Each stoker also is furnished with a residue discharge means 15 which will receive the burned-out material as it falls from the stoker in order to cool it in a quench bath (not shown).

Distribution of the additive is achieved by both metering and feeding the additive into the additive distributor and delivering the additive, together with the overfire air into the furnace chamber where the configuration and arrangement of overfire air nozzles 42 (FIG. 2) will ensure not only the injection of additive into the reaction areas of the turbulent zone, but also its proper distribution over the width of the furnace. In addition, this configuration may allow for the maximum possible reaction time and additional mixing as the flue gas passes over various tube banks and makes turns within the incinerator.

Once mixed with reactive gases, the additive and gases, for example, can flow through the first pass 24 and around through and down the second gas passage 26. The base of second gas passage 25 includes an ash collection clean-out 21. The heated gases then pass through the gas passage superheater section 28 wherein hot gases flow through a plurality of convection tubes 29 which are surrounded by a liquid shell 31. The resultant reaction, in turn, produces sufficient steam pressure in order to generate thermal energy. The now cooled gases then pass through a fourth passage tube exchange section 30 whereby additional energy is produced across the convective tubes 33. The remaining gases can then be passed out of the incinerator through outlet 35 to additional semi-dry scrubbing equipment (not shown) including a scrubber/reactor and particulate control device such as a baghouse filter dust collector (baghouse) or an electrostatic precipitator.

Figure 2:
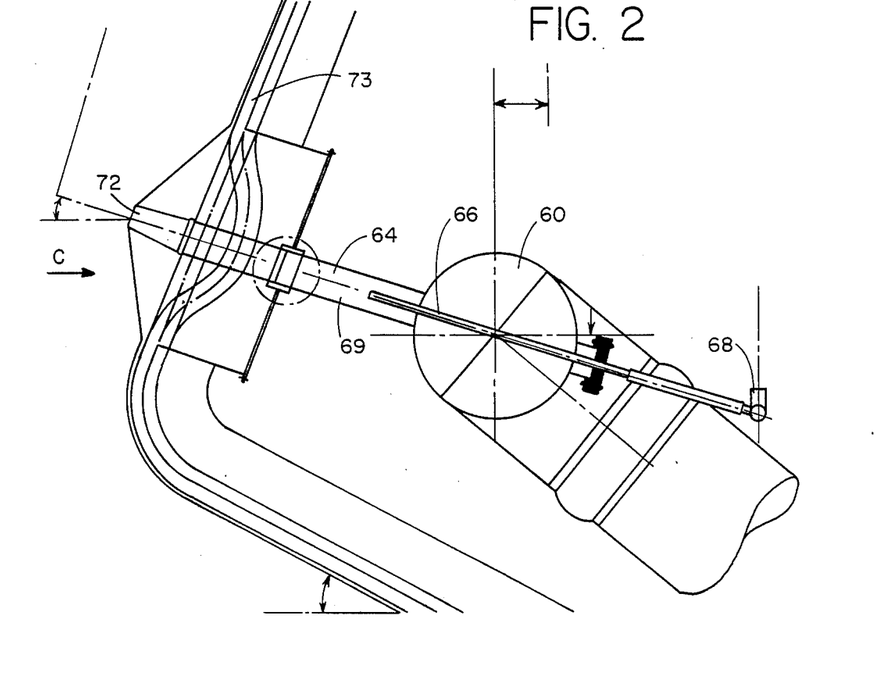
FIG. 2 is a cross-sectional view of the overfire header, and additive distributor arrangement connecting the additive metering/feeder system to the incinerator shown in FIG. 1.
Figure 3:
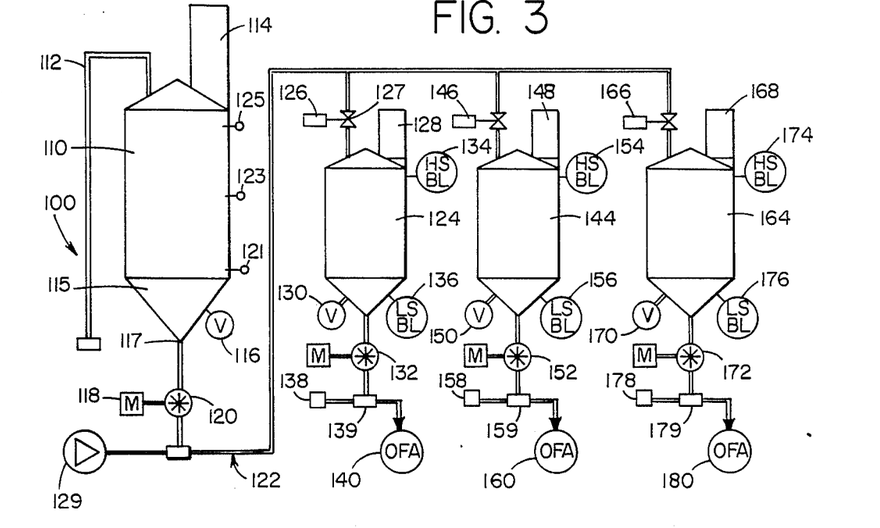
FIG. 3 illustrates a schematic view of the additive unloading, conveying and injection systems used to supply additive to the apparatus shown in FIGS. 1-2.

FIG. 2 shows a cross-sectional view of the additive injection system as generally set forth by reference numbers 40 and 42 in FIG. 1. More particularly, the overfire header 60 is constructed to span the length of the furnace wall such that a plurality of supply pipes 64 are distributed evenly across the entire length of the turbulent reaction zone of the furnace. In one embodiment, six wall supply pipes are used to supply additive material through one wall 73 of the incinerator. The additive is supplied to the incinerator through a distributor lance 66 attached to an additive distributor pipe 68. Additive is supplied to the distributor pipe 68 from the additive metering feeder system 106 (FIG. 3). In operation, overfire air flowing through supply pipe 64 and additive flowing through lance 66 are combined at lower portion 69. The air and entrained additive are then injected into the incinerator through a nozzle 72. The overfire air header and supply pipe arrangement can be connected to any wall of the incinerator as long as the width of the furnace is of sufficient size that the overfire air can penetrate into the furnace.

Each of the nozzles 72 direct the additive to a particular area of the turbulent reaction zone. As such, the array of additive and air supply pipes ensure an even distribution of the additive across the entire width of the incinerator turbulent reaction zone. By providing such distribution, the reaction between the noxious gases and the additive material is maximized by the physical arrangement of the additive supply pipes and injection nozzles.

FIG. 3 illustrates the additive metering feeder system 100 forming part of the present incineration system. More particularly, the main components of the additive metering/feeder system constitute a bulk storage silo 110, a first day (surge) bin 124, a second day (surge) bin 144 and a third day (surge) bin 164.

The bulk storage silo 110 can be of bolted construction, and include truck unload line 112 which then transports material from an unloading station up to the top portion of the bulk storage silo 110. The amount of material that can be stored in the bulk storage silo 110 is variable depending upon the required additive use and the frequency of filling.

The silo skirt is weatherproof and equipped with a personnel door, lighting and power outlets and houses an air-blower package 129 including filter and silencers to provide clean conveying air. The equipment for feeding additives into the pneumatic transport line consists of bin activator 116, manual shut-off gate (not shown) and outlet 117 and a rotary metering feeder (airlock) 120 having replaceable wear strips (not shown). All piping in the system is conventional. Examples of such piping can include seamless, extra heavy-duty wall ASTM A-53 pipes equipped with replaceable flanged long-radius elbows and airtight poke ports.

The bulk storage silo includes a baghouse filter arrangement 114. The filter is employed to remove fugitive particles, and other loose material in the silo generated during the additive tanker offloading. The silo further includes a conical hopper portion 115. A vibrator (activator) 116 is located at the base of the hopper portion and is adapted to shake the bulk storage silo such that material is loosened to such a degree that a free flow occurs through outlet 117. The amount of flow out of outlet 117 is further controlled by the rotary valve or metering feeder 120 driven by a motor 118.

The rotary valve or metering feeder motor 118 is, in turn, attached to a centralized controller which responds to a number of signals indicating the need for additional material downstream. The control system covers the initiation and sequencing of each day bin filling and purging and pressure monitoring of the conveying lines. The system is completely automatic but can be switched to manual operation should the situation demand it.

The bulk storage silo further includes three indicators 121, 123 and 125 which annunciate to alarm operators the additive levels in the silo. The mid-point indicator 123 allows operators to order trucks in time to refill the silo. The filling of the silo will begin usually when the additive level has reached the low-level signal provided by low-point indicator 121. Finally, loading of the silo 110 will stop when the high level is signaled by high-point indicator 125. A short interval after each filling is allowed in order to purge the filling line clean.

The outlet of the metering feeder 120 supplies additive to a pneumatic conveying system 122. The system 122 is driven by a blower 129 that provides compressed air such that a linear flow of additive occurs when the material is entrained into the air stream. The compressed instrument air supplied by an air compressor (not shown) is required for cleaning the baghouse filters 114, 128, 148 and 168, respectively.

Located along the pneumatic conveying means are a plurality of day (surge) bins 124, 144 and 164. Each of the bins is equipped with an inlet valve motor 126, 146 and 166 and an associated inlet valve 127, 147 and 167. Each of the day (surge) bins also includes a vent filter/dust collector arrangement 128, 148 and 168. Further, the day (surge) bins each include a respective vibrator assembly 130, 150 and 170, located about the conical hopper for agitating powdered additives. A motor and a motorized metering feeder arrangement 132, 152 and 172, as well as sealing means 139, 159 and 179 also are provided at each of the bins. Each sealing means can consist of an appropriate valve arrangement or a venturi device.

The metering feeders 132, 152 and 172 comprise a double concentric auger mechanism (not shown) which is constructed in order to ensure a constant, uniform and accurate volumetric feed out of the day (surge) bins 124, 144 and 164. The double concentric design operates in such a manner that the outer auger acts to condition the pulverized additive into a uniform product density while the inner auger, which operates at a much slower speed, feeds the material into the pneumatic conveying system 139, 159 and 179. An example of such a metering feeder includes the Acrison Model 105 Volumetric Dry Solids Feeder.

Each day (surge) bin includes a device for indicating high day (surge) bin levels and low day (surge) bin levels at each respective bin. The low day (surge) bin level indicators 136, 156 and 176 are arranged such that once the additive drops to the bottom of each day (surge) bin, the low day (surge) bin level indicator provides a signal to the above-described electrical system controller (not shown).

The controller then imparts a control signal to a two-way isolation valve located in the pneumatic conveying system that will automatically position to feed the bin. When the day (surge) bin indicates a low level signal, the day (surge) bin is filled from the bulk storage silo until the high day (surge) bin level 134, 154 or 174 signal is provided to the controller.

Each day (surge) bin will have a capacity of approximately eight hours worth of additive. Moreover, the operation of the day (surge) bin filling can be selected by the operator for manual or automatic operation. In either case, should any day (surge) bin run low, the signal from the low level probe 136, 156 or 176 will cause a corresponding light on the control panel (not shown) to illuminate. When manual filling is selected, the operator will wait until the respective high level light illuminates, in which case he switches off the filling sequence. During normal, continuous operation, for example, each day (surge) bin can be filled in intervals of eight hours.

The additive metering and feeding from each day (surge) bin also is independent of the bin filling operation and can occur in an uninterrupted fashion. The capacity, therefore, of the bulk silo 110 is such that a sufficient supply of additive can be provided to the day (surge) bins, thus ensuring a continuous supply of additive into the incinerator. The additive material is respectively supplied to the overfire air header through the day (surge) metering feeders 132, 152 and 172 to a compressed air delivery system 138, 158 and 178.

There are two possible operating modes for the additive metering/feeders 132, 152 and 172. In the first mode, a constant additive feed rate is maintained based on the required acid gas reduction established during routine testing. In a second mode, the system will inject the dry additive at a rate determined by the $SO_2$ concentrations in the fluegas as measured at a convenient location downstream of the combustion train. A typical measurement point, for example, would be at the electrostatic precipitator outlet (not shown).

Figure 4:
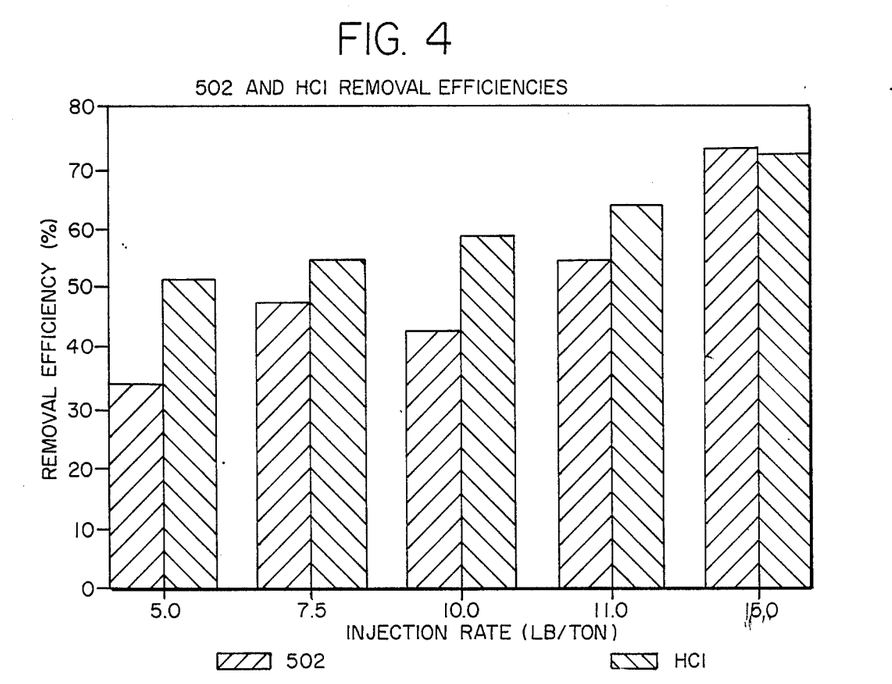
FIG. 4 is a chart illustrating $SO_2$ and $HCl$ removal efficiencies at various additive metering/feeder rates.

FIG. 4 illustrates the various acid gas reductions that are achieved based upon the injection rate. The reductions are plotted on the vertical axis as a removal efficiency percentage. The injection rate of the additive, in turn, is plotted on the horizontal axis based upon an injection rate in pounds per ton of refuse.

The additive used to achieve the results of FIG. 4 consists of a chemically hydrated lime $Ca(OH)_2$. The typical analysis of this hydrate is presented in Table 1 below:

| Typical Analysis | $Ca(OH)_2$ |
| --- | --- |
| CaO | 73.60% |
| MgO | 0.63% |
| $SiO_2$ Insoluables | 1.55% |
| $Fe_2O_3$ | 1.00% |
| $Al_2O_3$ | .20% |
| Sulfur | 0.02% |
| Loss of Ignition | 23.00% |
| | 100.00% |
| Physical Tests | |
| Fineness | |
| % Passing | |
| (U.S. Std. Sieve Series) | |
| #30 | 100 |
| #60 | 100-tr |
| #100 | 99.9 |
| #200 | 96 |
| #325 | 84.8 |
| Bulk Density -lb/cu ft | |
| Loose | 19 |
| Packed | 40 |
| Surface Area ($cm_2$/gm) | 20,000 |
| Avg Particle Dis. (microns) | 1.34 |
| Density (g/$cm^3$) | 2.24 |

The quantity of material, the frequency in which it is presented into the boiler and the temperatures at which the additives are heated are further illustrated in the following examples:

EXAMPLE 1

Testing was done at a mobile additive metering/feeder unit consisting of a small bin with a pneumatic activator chute, a venturi injector, a solenoid valve arrangement and a timing control system. The additive used consisted of the $Ca(OH)_2$ composition described above. The additive was injected through the overfire header 60 (FIG. 2) into the turbulent reaction zone of the furnace at a rate of between 200–400 lbs/hr. As a result of this test, a 35% reduction of sulfur dioxide was achieved and the following results were measured:

TABLE 2

| | $O_2$ | $SO_2$ | $CO_2$ (Calc.) |
| --- | --- | --- | --- |
| Pre-Test | 9.5 | 133 | (10.3) |
| Post-Test | 8.7 | 140 | (11.1) |
| Average | 9.1 | 137 | 10.7 |
| Corr. to 7% $O_2$ | 7.0 | 161 | 12.8 |

TABLE 2-continued

|  | $O_2$ | $SO_2$ | $CO_2$ (Calc.) |
|---|---|---|---|
| Corr. to 12% $CO_2$ | 7.8 | 153 | 12.0 |
| Injection Test | 9.1 | 88 | 10.7 |
| Corr. to 7% $O_2$ | 7.0 | 104 | 12.8 |
| Corr. to 12% $CO_2$ | 7.8 | 99 | 12.0 |
| $SO_2$ Reduction |  |  |  |
| Corr. to 7% $O_2$ |  |  | 57 ppm. 35% |
| Corr. to 12% $CO_2$ |  |  | 54 |

EXAMPLE 2

Hydrated additive, $Ca(OH)_2$ was injected through the additive distributor 68 and the overfire header 60 into the turbulent reaction zone of the lower furnace when the plant was fired up in the morning. As a result of this test, a 74% reduction in sulfur dioxide was achieved. The results for this example are as follows:

TABLE 3

|  | $O_2$ | $SO_2$ | $CO_2$ (Calc.) |
|---|---|---|---|
| Pre-Test | 10.0 | 169 | (9.8) |
| Post-Test | 10.9 | 81 | (8.9) |
| Average | 10.5 | 125 | 9.3 |
| Corr. to 7% $O_2$ | 7 | 166 | 12.8 |
| Corr. to 12% $CO_2$ | 7.8 | 160 | 12 |
| Injection test | 9.8 | 35 | 10.0 |
| Corr. to 7% $O_2$ | 7 | 44 | 12.8 |
| Corr. to 12% $O_2$ | 7.8 | 42 | 12 |
| $SO_2$ Reduction |  |  |  |
| Corr. to 7% $O_2$ |  | 122 p.p.m. |  |
| Corr. to 12% $O_2$ | 118 |  |  |

EXAMPLE 3

Calcium hydroxide was injected into the fourth gas passage 30 in the incinerator shown in FIG. 1. As a result of using the same additive in similar concentrations of approximately 200 lbs/hr or 15 lbs/ton, a 23% reduction in sulfur dioxide was achieved. The results for this example are shown below:

TABLE 4

|  | $O_2$ | $SO_2$ | $CO_2$ (Calc.) |
|---|---|---|---|
| Pre-Test | 10.0 | 81 | (8.7) |
| Post-Test | 11.0 | 137 | (8.8) |
| Average | 11.0 | 109 | 8.8 |
| Corr. to 7% $O_2$ | 7.0 | 152 | 12.8 |
| Corr. to 12% $CO_2$ | 7.8 | 148 | 12.0 |
| Injection test | 10.2 | 90 | 9.6 |
| Corr. to 7% $O_2$ | 7 | 117 | 12.8 |
| Corr. to 12% $O_2$ | 7.8 | 113 | 12 |
| $SO_2$ Reduction |  |  |  |
| Corr. to 7% $O_2$ |  |  | 35 p.p.m. |
| Corr. to 12% $O_2$ |  |  | 35 |

While the invention has been described in detail with reference to specific embodiments thereof, it will be apparent to one skilled in the art that various changes and modifications can be made without departing from the spirit and scope thereof.

What is claimed is:

1. An apparatus for incinerating waste material, comprising:
    a furnace section having a turbulent combustion zone;
    an additive injection device located adjacent to said turbulent combustion zone of said furnace section;
    an additive metering and feeding device for supplying any one of a plurality of additives through said additive injection device and into said turbulent combustion zone of said furnace section to produce optimum adsorption reactions with combustion products of such waste materials;
    a bulk storage silo for holding said additive;
    a plurality of day bins connected to said bulk storage silo for receiving said additive and respectively supplying said additive to supply pipes;
    an unloading device attached at one end to a top portion of said bulk storage silo and having an opposite end located at a point where additive can be supplied into said unloading device;
    a venting device located on a top portion of said bulk storage silo and adapted to collect airborne matter;
    a vibrating device formed along a portion of said bulk storage silo for vibrating said portion in order that additives stored therein flow freely out of said bulk storage silo;
    a motorized metering feeder located adjacent to said vibrating device for controlling the flow rate of additives out of said bulk storage silo; and
    a pneumatic conveying system attached to said bulk storage silo whereby additives are entrained into a pressurized air stream such that said additives are conveyed through said pneumatic conveying system to said day (surge) bins.

2. The apparatus according to claim 1, wherein each of said plurality of day (surge) bins further includes:
    a motorized inlet valve for directing the additive to each of said day bins;
    a venting arrangement adapted to collect airborne matter in each of said day bins;
    a vibrating arrangement formed along a portion of each of said day bins in order to promote free flow of said additives out of each of said day bins;
    a motorized metering feeder connected to each of said day bins for controlling a flow rate of additive out of each of said day bins.

3. The apparatus of claim 2, wherein each of said day bins includes a high surge bin level indicator for signalling when to stop filling, when to purge said pneumatic conveying system and when to stop said pneumatic conveying system.

4. The apparatus according to claim 2, wherein each of said day bins includes a low surge bin level indicator for signalling when said day (surge) bin level is too low such that said bulk storage silo is activated to supply additional additives to said day bin having said low level.

5. An apparatus for incinerating waste material, comprising:
    a furnace section having a turbulent combustion zone;
    an additive injection device located adjacent to said turbulent combustion zone of said furnace section;
    an additive metering and feeding device for supplying an additive through said additive injection device and into said turbulent combustion zone of said furnace section to produce optimum adsorption reactions with combustion products of such waste materials;
    said additive injection device further comprising a plurality of supply pipes connected to an overfire header;
    said overfire header spanning an area of said furnace section such that said plurality of supply pipes are connected evenly across said furnace in order to inject said additive evenly throughout said turbulent combustion zone in said furnace;

said additive injection device further including an additive distributing system located adjacent to said overfire header;

a distributor lance attached at a first end to said additive distributing system and having a second end located in said supply pipe; and wherein said second end of said distributor lance is disposed centrally along a longitudinal axis of said supply pipe such that overfire air flowing from said overfire header and into said supply pipe entrains additives supplied from said additive distributing system through said distributor lance.

6. The apparatus according to claim 5, wherein said supply pipe is connected on its furnace end to a nozzle adapted to spray said overfire air and said entrained additive into said turbulent combustion zone of said incinerator.

7. An apparatus for incinerating waste material, comprising:

a furnace section having a turbulent combustion zone;

an additive injection device located adjacent said furnace section and connected thereto in order to supply additives to said turbulent combustion zone of said furnace section;

an additive metering and feeding device for supplying any one of a plurality of additives through said additive injection device and into said turbulent combustion zone of said furnace section to produce optimum absorption reactions with combustion products of such waste materials;

a bulk storage silo for holding said additive;

a plurality of day bins connected to said bulk storage silo for receiving said additive and respectively supplying said additive to said supply pipes;

an unloading device attached at one end to a top portion of said bulk storage silo and having an opposite end located at a point where additives can be supplied into said unloading device;

a venting device located on said to portion of said bulk storage silo and adapted to collect airborne matter;

a vibrating device formed along a portion of said bulk storage silo for vibrating said portion in order that additives stored therein flow freely out of said bulk storage silo;

a motorized metering feeder located adjacent to said vibrating device for controlling the flow rate of additives out of said bulk storage silo; and a pneumatic conveying system attached to said bulk storage silo wherein additives are entrained into a pressurized air stream such that said additives are conveyed through said pneumatic conveyor to said day bins.

8. The apparatus according to claim 7, wherein each of said plurality of day (surge) bins further includes:

a motorized inlet valve for directing the additive to each of said day (surge) bins;

a venting arrangement adapted to collect airborne matter in each of said day (surge) bins;

a vibrating arrangement formed along a portion of each of said day bins in order to promote a free flow of said additives out of each of said day (surge) bins; and a motorized metering feeder connected to each of said day bins for controlling a flow rate of additive out of each of said day (surge) bins.

9. The apparatus of claim 8, wherein each of said day (surge) bins includes a high surge bin level indicator for signalling when to stop filling said surge bin, when to purge said pneumatic conveying system and when to stop operation of said pneumatic conveying system.

10. The apparatus according to claim 9, wherein each of said day (surge) bins includes a low surge bin level indicator for signalling when said day (surge) bin level is too low such that said bulk storage silo is activated to supply additional additives to said day (surge) bin having said low level.

* * * * *